Aug. 11, 1964     H. MUTH     3,144,017

PILL-TYPE SWALLOWABLE TRANSMITTER

Filed Jan. 3, 1961

INVENTOR
Herbert Muth

BY George H. Spencer

ATTORNEY

United States Patent Office 3,144,017
Patented Aug. 11, 1964

3,144,017
PILL-TYPE SWALLOWABLE TRANSMITTER
Herbert Muth, Neu-Ulm, Offenhausen, Germany, assignor to Telefunken Aktiengesellschaft, Berlin, Germany
Filed Jan. 3, 1961, Ser. No. 80,236
Claims priority, application Germany Jan. 7, 1960
11 Claims. (Cl. 128—2.1)

The present invention relates to a pill-shaped swallowable transmitter, i.e., a transmitter having the configuration of a small rounded mass, such as a ball or capsule, and capable of being swallowed by a human being, the purpose of this transmitter being to broadcast to an external receiver the pH value or other condition measured in the digestive system, namely, the stomach and intestines, of a patient. The transmitter has a transmitting coil whose radiations are picked up by the receiving coil of the receiver, and the circuitry of the transmitter and receiver may be such that the frequency of the transmitted impulses is a function of the condition being measured.

There exist pill-type transmitters in which the transmitting coil is arranged within the transmitter housing or casing. Such transmitters have short multiple layer cylindrical coils whose outside diameter is just equal to the inside diameter of the casing, and it has been found that the coupling between the transmitting and receiving coils is very low. Consequently, not only must a number of amplifier stages be provided, but there is a poor signal-to-noise ratio.

It is, therefore, a basic object of the present invention to provide an arrangement in which the coupling between the transmitting coil of a swallowable transmitter and the receiving coil of an external receiver is higher than in heretofore known arrangements, without, however, adversely affecting the ease with which the transmitter may be swallowed. This higher coupling produces a higher signal-to-noise ratio; furthermore, the amplifying means become simpler and more economical.

With the above object in view, the present invention resides mainly in a swallowable transmitter in which the coupling between the transmitting and receiving coils is increased, as compared with heretofore known arrangements, by arranging the transmitting coil externally of or within the wall of the transmitter casing.

The above arrangement is based on the recognition of the fact that by increasing the diameter of a circular coil, the mutual inductance between the two coils and consequently the coupling therebetween may be increased. The same holds true for coils of non-circular cross section, in which case the corresponding dimensions are increased. For the sake of simplicity, however, the following description will concern itself only with coils of circular cross section.

The present invention is further based on the recognition that, in a pill-type transmitter, the effective diameter of the transmitting coil is approximately doubled if it is wound about the exterior of the transmitter casing. While a conventional transmitting coil which is arranged within the casing is made in the form of a multiple layer coil, an externally arranged coil, or a coil arranged within the wall of the transmitter casing, is advantageously in the form of a single layer coil. As a result, the winding will occupy no appreciable space at all.

According to one embodiment, the coil is wound upon the outside of the casing such as to increase the overall diameter to a very slight extent. This, however, will have virtually no effect on the ease with which the transmitter is swallowed, particularly if the coil is covered with a protective material which has such a shape as to facilitate swallowing.

According to other embodiments, the diameter of the transmitter casing is not increased at all, so that the external or embedded arrangement of the transmitting coil will have no effect whatever on the ease with which the transmitter is swallowed.

Additional objects and advantages of the present invention will become apparent when taken in conjunction with the accompanying drawing in which.

Figure 1:
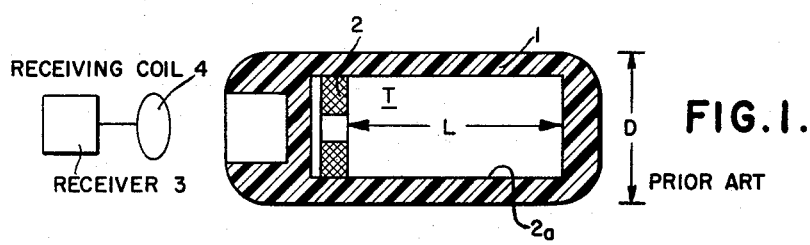
FIGURE 1 is a sectional view, on an enlarged scale, of a swallowable transmitter according to the prior art.

Referring now to the drawings, FIGURE 1 is a sectional view, on an enlarged scale, of a pill-type transmitter according to the prior art. This transmitter comprises a cylindrical hollow casing 1 made of a suitable plastic, such as polyethylene. The casing has a diameter D and contains a multiple layer transmitting coil 2 of thin wire (about 0.1 mm. diameter) which is arranged entirely within the interior cavity 2a of the casing 1. The remainder of the interior cavity is of a length shown at L and is occupied by the circuit components and the battery, hereinafter collectively referred to as transmitter circuit means and shown at T, by means of which the broadcast frequency of the transmitter is made responsive to the pH value or other condition being measured. These transmitter circuit components, which per se are known and do not form any part of the present invention, are connected to the coil 2 and may be of the type shown, for example, in the journal Nachrichtentechnik—9, 1959, H. 10, p. 449 to 456 (Die Technik des verschluckbaren Intestinalsenders).

The external receiver 3 and the receiver coil 4 are shown schematically, inasmuch as they, too, are of known construction.

Figure 2:
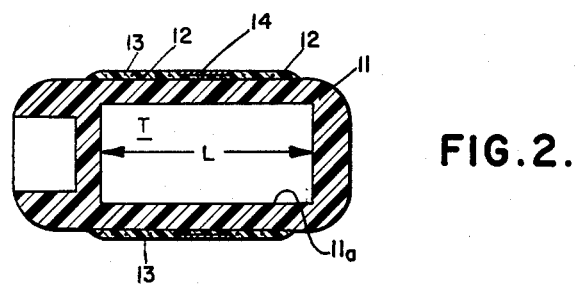
FIGURES 2 to 4 are sectional views of various embodiments of a swallowable transmitter according to the present invention.

FIGURE 2 is an embodiment of a transmitter according to the present invention. This transmitter comprises a cylindrical hollow plastic casing 11 about the exterior of which a single layer transmitting coil 12 is wound. The coil is embedded in a plastic layer 13 to protect it against the effect of stomach and intestinal acids and other fluids. The plastic layer 13 is preferably of the same material as that of which the casing is made. The transmitter also includes a ferrite foil 14, the purpose of which will be explained below.

It will be appreciated that irrespective of the electrical advantages of the above arrangement, the transmitter as a whole can be made shorter by an amount equal to the thickness of the coil 2 of the embodiment of FIGURE 1, without reducing the length L of the interior cavity 11a. Thus, the transmitter circuit means T of FIGURE 2 will be able to accommodate the same electrical components as the prior art transmitter of FIGURE 1. The slight increase in the diameter of the transmitter will have no appreciable effect on the ease with which the transmitter may be swallowed; indeed, it is expedient to impart to the plastic layer 13 the shape depicted in FIGURE 2 which will prevent any injury to the patient, thereby facilitating the swallowing.

Figure 3:
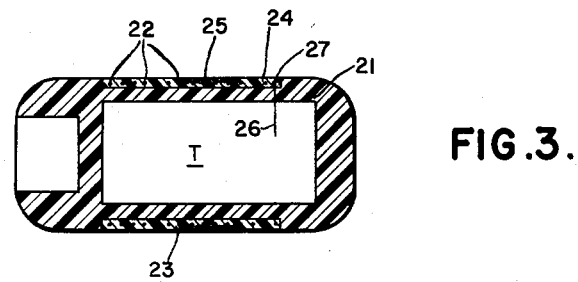

The transmitter embodiment of FIGURE 3 comprises a casing 21 having the same over-all dimensions as the casing 11 of FIGURE 2, including the wall thickness necessary to impart the requisite rigidity to the transmitter. The instant embodiment differs from the previously described one in that the outer surface of the wall of the casing 21 is formed with an annular recess 24, the depth of which is, for purposes of clarity, exaggerated, within which recess the coil 22 is arranged. After the coil has been wound about the casing 21, the recess 24 is filled with plastic protective material 23, which, as above, may be the same plastic as that of which the casing 21 is made. If the outer surface of the protective material is substantially flush with the outer surface of the casing 21, the external configuration as well as the rigidity of the casing 21 will be the same as that of the casing 11 of FIGURE 2, i.e., the casing without the layer 13 containing the coil 12. In other words, the finished transmitter has the same over-all dimensions, including wall thickness, as the casing 11. Here, too, the transmitter circuit means T are located in the cavity of the casing.

FIGURE 3 also shows a layer of metallic powder 25 which is applied to part of the windings of the coil, the purpose of which will be explained below.

Figure 4:
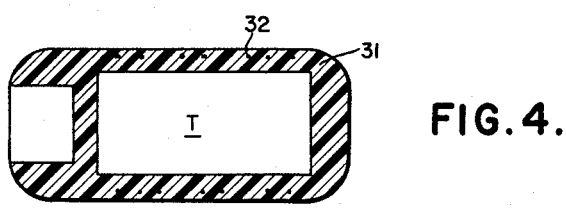

In the embodiment of FIGURE 4, the casing 31 which contains the transmitter circuit means T has the coil 32 embedded within its wall. Such a transmitter can be made by first winding the coil and then forming the casing about the coil, as, for example, by conventional injection molding techniques, so that after the casing has been molded, the winding 32 will be embedded therewithin. During this process, the coil serves as a frame for the casing being injection molded or otherwise formed.

As explained above, by arranging the transmitting coil in the manner illustrated in FIGURES 2 through 4, the diameter of this coil can be about doubled. If the coupling factor is calculated for the arrangement of FIGURE 1 and for the arrangements of FIGURES 2 through 4, the latter will have a coupling factor which is about 5 to 10 times as large as that of the prior art embodiment. This means that the incoming signal voltage, in the arrangement according to the present invention, will be about 5 to 10 times as large as the signal voltage emitted by a transmitter according to the prior art, so that less amplifying means are required. Furthermore, the signal-to-noise ratio is substantially increased.

The coils 12, 22, 32 will, of course, be connected to the electrical circuit components arranged within the interior cavities of the respective casings, and the passages through which the connecting leads run will be sealed, in the embodiments of FIGURES 2 and 3, by the plastic layers 13, 23, respectively. One such lead 26 is shown in FIGURE 3, the external end of this lead being connected to the coil 22 by a soldered joint 27.

It will be seen from the above that the electrical advantages, namely, the increased coupling between the transmitter and receiving coils, are achieved without this giving rise to any disadvantages; on the contrary, the improved arrangement brings with it the additional advantage that the over-all length of the transmitter may be reduced. As stated above, the illustrated embodiments involve cylindrical bodies, but it is clear that the present invention is applicable to pill-type transmitters of other configurations, in which the appropriate dimensions may be changed to produce the same results.

Yet another advantage of the present invention is that the inductance of the transmitting coil can be varied after the transmitter has been manufactured, which is not readily possible in the case of a transmitter having its transmitting coil arranged on the inside. The fact that the inductance can be varied is of especial importance in cases when this inductance is one of the factors which determines the transmitting frequency of the device, the latter being the variable quantity which is a function of the condition being measured. It is true that the coil can be wound so as to have the requisite inductance, but experience has shown that, in practice, the coil in the finished transmitter will not have precisely the inductance which it was intended to have. According to the present invention, the inductance of the coil can be made purposely too large by providing a number of turns above and beyond those necessary to obtain the desired inductance, whereupon the device may be adjusted to the precise frequency by removing turns until the coil has the requisite inductance, after which the plastic protective layer is applied. For this, a soldered joint between the coil and the lead connecting the coil with the interior of the casing is sufficient, i.e., turns, or portions thereof, may be taken out of the electrical circuit by changing the point of the soldered joint 27 (FIGURE 3) at which the lead 26 is connected.

The inductance may be changed even more simply by adhering a ferrite foil onto the winding or by applying a metallic powder, the formed being shown at 14 in FIGURE 2 and the latter at 25 in FIGURE 3. The inductance of the coil is initially and purposely kept too small, whereafter the inductance is increased by applying the foil or powder. As above, the plastic protective layer is not applied until the inductance of the coil has been adjusted to the desired value.

It will be understood that the above description of the present invention is susceptible to various modifications, changes and adaptations, and the same are intended to be comprehended within the meaning and range of equivalents of the appended claims.

I claim:

1. A pill-type swallowable transmitter for transmitting to an external receiver having a receiving coil electrical signals which are indicative of a condition to be measured in the digestive system of a patient, said transmitter comprising, in combination: a casing having an interior cavity; transmitter circuit means located within said interior cavity; transmitter circuit means located within said interior cavity; and a transmitting coil connected to said transmitter circuit means, said transmitting coil being carried by said casing and located outside of said interior cavity, whereby the coupling between said coils is greater than if said transmitting coil were located within said interior cavity.

2. A transmitter as defined in claim 1 wherein said transmitting coil is arranged exteriorly of said casing.

3. A transmitter as defined in claim 2, further comprising means for adjusting the inductance of said transmitting coil after the same has been mounted onto said casing.

4. A transmitter as defined in claim 3 wherein the inductance of said transmitting coil is initially made purposely too small and wherein said means comprise a metallic substance applied to said transmitting coil for increasing the inductance thereof.

5. A transmitter as defined in claim 4 wherein said metallic substance is a powder.

6. A transmitter as defined in claim 4 wherein said metallic substance is a ferrite foil.

7. A transmitter as defined in claim 1 wherein said transmitting coil is embedded in the wall of said casing.

8. A transmitter as defined in claim 1 wherein said casing has an outer annular recess, said transmitting coil being arranged within said recess.

9. A transmitter as defined in claim 8 wherein said recess is filled with a protective material.

10. A transmitter as defined in claim 9 wherein said protective material has an outer surface which is substantially flush with the outer surface of said casing.

11. A transmitter as defined in claim 8 wherein said protective material is the same as that of which said casing is made.

References Cited in the file of this patent

UNITED STATES PATENTS

| 2,069,284 | Solomon | Feb. 2, 1937 |
|---|---|---|
| 2,119,380 | Carter | May 31, 1938 |
| 2,958,781 | Marchal | Nov. 1, 1960 |
| 2,993,118 | Block | July 18, 1961 |
| 3,034,356 | Bieganski | May 15, 1962 |

FOREIGN PATENTS

Science and Mechanics for February 1950, pp. 80–81.
"Die Technik . . ." by M. von Ardenne, Nachrichten Technik 9 (1959), H. 10, pp. 449–456.